United States Patent van der Lely

[11] 3,977,167
[45] Aug. 31, 1976

[54] IMPLEMENTS FOR THE DISPLACEMENT OF CROP OR LIKE MATERIAL LYING ON THE GROUND

[76] Inventor: Ary van der Lely, 10, Weverskade, Maasland, Netherlands

[22] Filed: June 16, 1975

[21] Appl. No.: 587,391

Related U.S. Application Data

[62] Division of Ser. No. 378,637, July 12, 1973, Pat. No. 3,896,613.

[30] Foreign Application Priority Data

July 13, 1972 Netherlands........................ 7209663

[52] U.S. Cl. .................................................. 56/370
[51] Int. Cl.² ......................................... A01D 79/02
[58] Field of Search....................... 56/370, 377, 365

[56] References Cited
UNITED STATES PATENTS 3,648,448   3/1972   Maugg ................................. 56/370

Primary Examiner—J.N. Eskovitz
Attorney, Agent, or Firm—Mason, Mason & Albright

[57] ABSTRACT

A raking implement has one or more rake heads each of which rotates about an upwardly extending shaft. Each rake head has tines that are movable into alternative crop working positions and the tines are pivoted on a support with connections to a ring-shaped adjustment member. The ring-shaped member is coaxial with the shaft and movable lengthwise of the shaft. The movements of the member lengthwise of the shaft or along the axis of rotation of the rake head causes the tines to pivot from one working position to another.

10 Claims, 7 Drawing Figures

IMPLEMENTS FOR THE DISPLACEMENT OF CROP OR LIKE MATERIAL LYING ON THE GROUND

This application is a division of Ser. No. 378,637 filed July 12, 1973 and now U.S. Pat. No. 3,896,613 and is directed to an aspect of the implement disclosed therein.

The rake heads or members shown in the appended drawings are for use on the implement shown in FIG. 1 of Ser. No. 378,637 and have the same spokes 44 and felly 43 that rotate about shaft 27. However, instead of the adjustment to steering rods 80 in the aforementioned application through the connections of pins 77 and holes 74–76, a different adjustment structure is employed.

Figure 2:
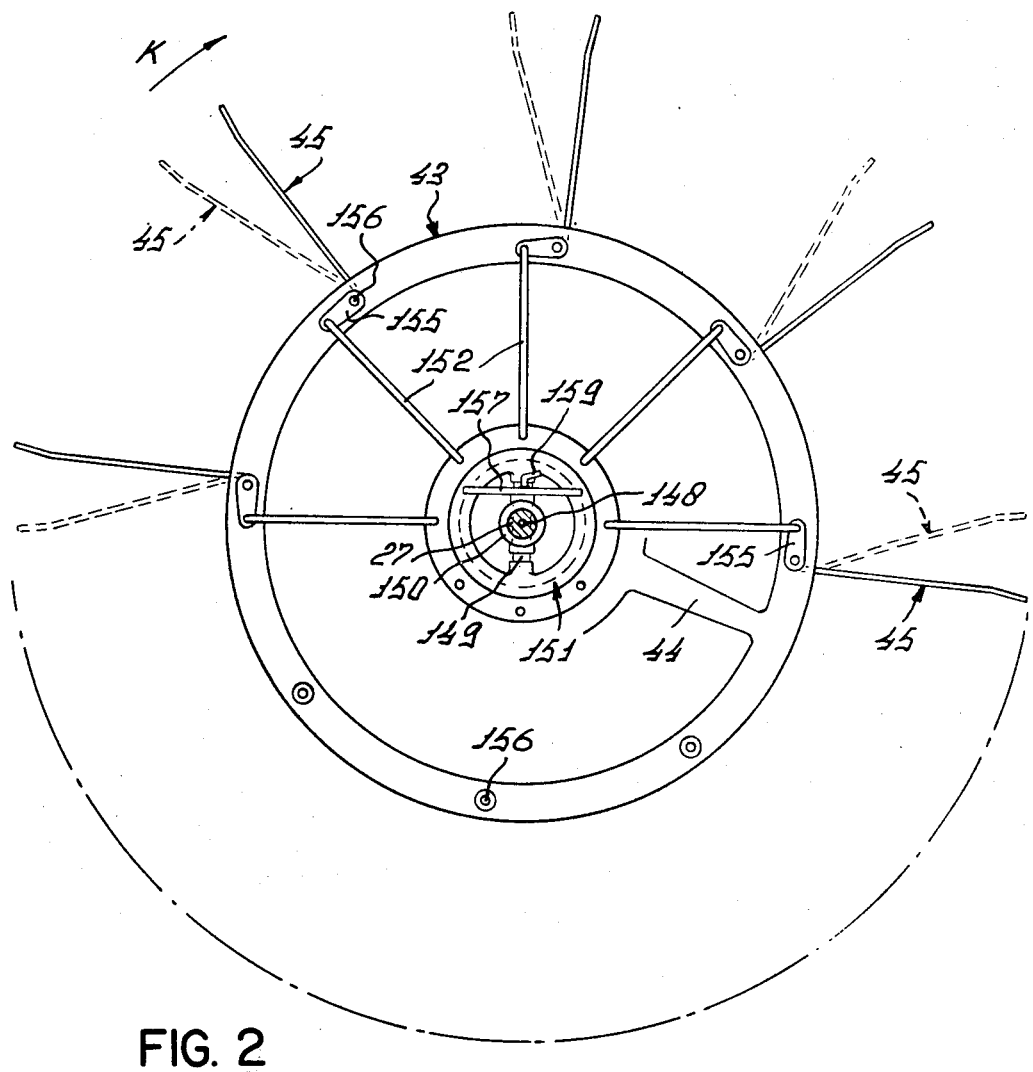
FIG. 2 is a plan view corresponding to FIG. 1.
Figure 1:
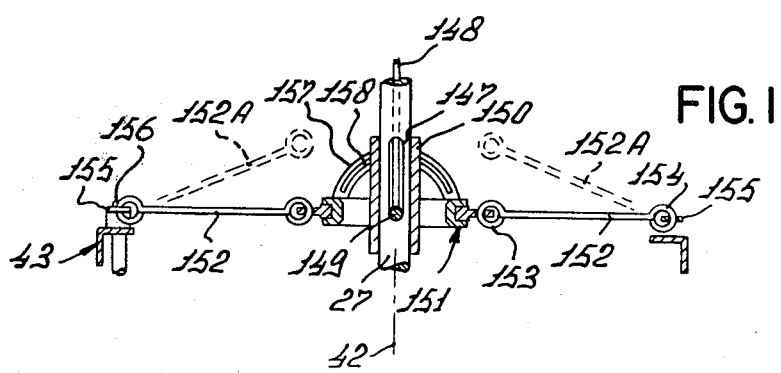
FIG. 1 is a schematic sectional elevation illustrating a structure for varying the angular settings of the tines of the rake members.
Figure 4:
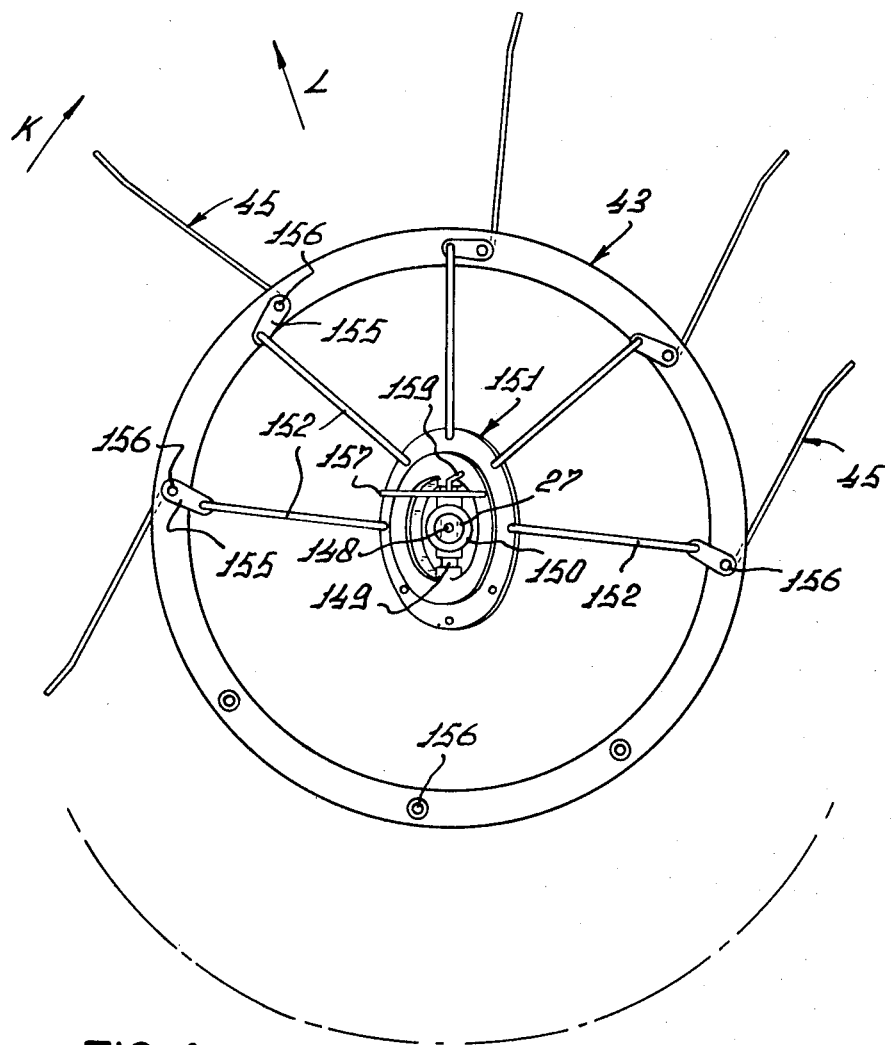
Figure 3:
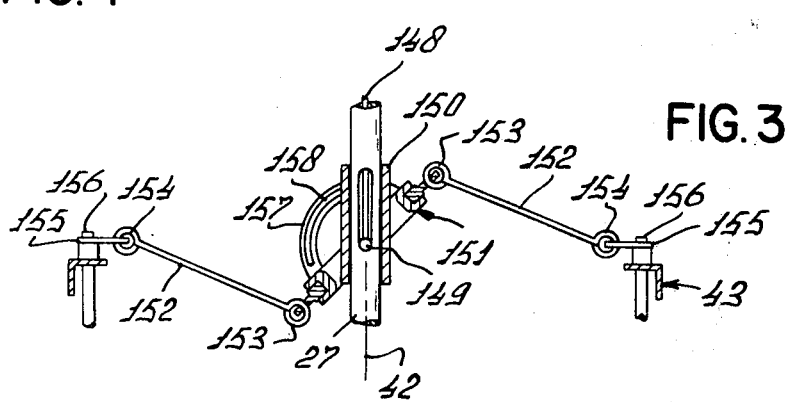
Figure 5:
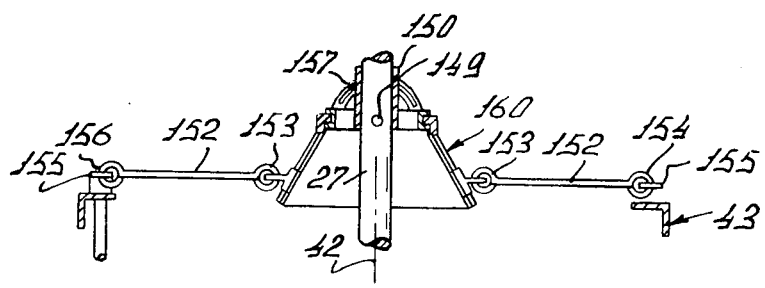
Figure 7:
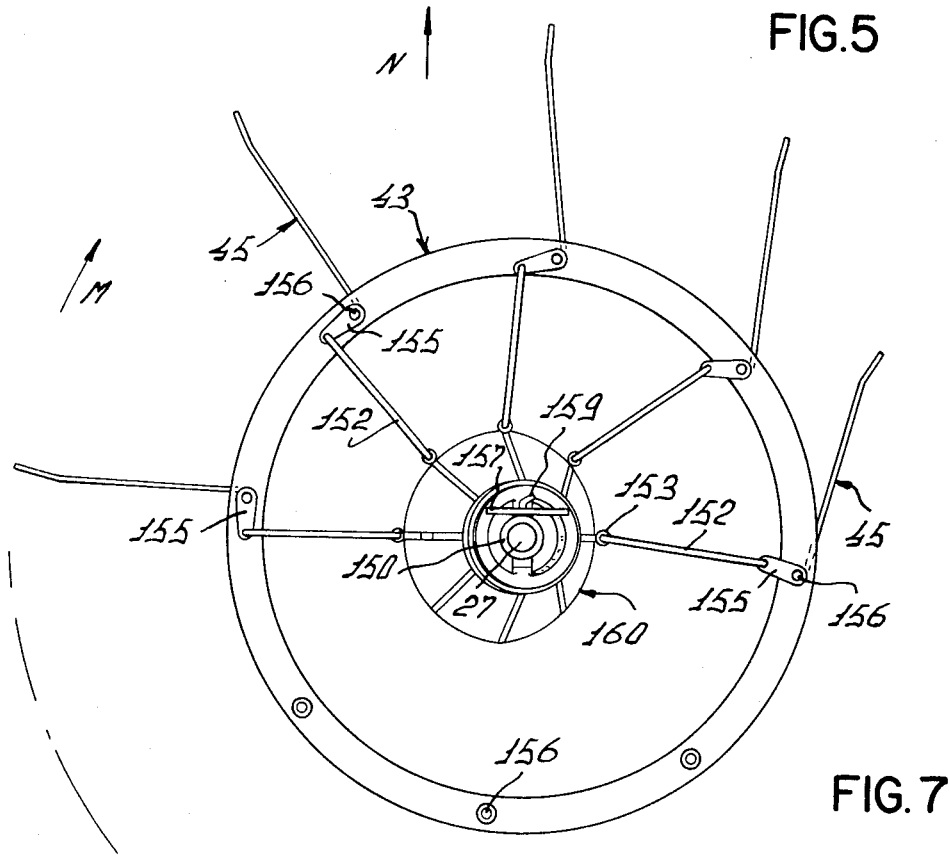
Figure 6:
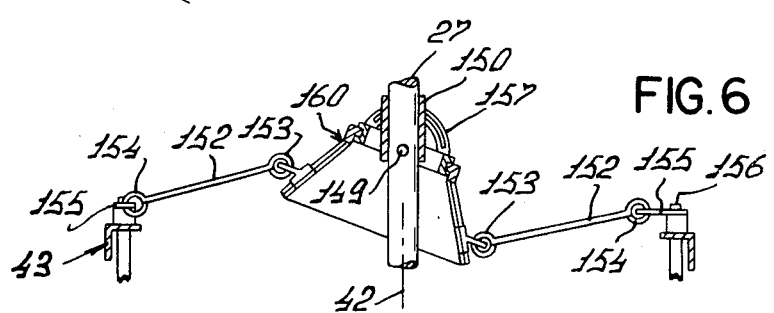

FIG. 3 corresponds to FIG. 1 but shows one practical tine setting that can be employed;

FIG. 4 is a plan view corresponding to FIG. 3;

FIG. 5 substantially corresponds to FIGS. 1–3 but illustrates an alternative structure;

FIG. 6 illustrates one practical tine setting that may be used employing the construction of FIG. 5; and FIG. 7 is a plan view corresponding to FIG. 6.

FIGS. 1 and 2 of the drawings illustrate an alternative rake member construction in which the central shaft 27 is hollow and is formed with diametrically opposite slots 147 that extend through the wall of the hollow shaft 27 and lengthwise thereof for a predetermined distance. A setting rod 148 is accommodated axially in the hollow shaft 27, the lowermost end of the setting rod 148 being provided with a substantially radial pin 149 that is a close but slidable fit in the slots 147. The setting rod 148 is movable lengthwise of the axis 42 through the hollow shaft 27 within the limits dictated by abutment of the pin 149 with the lower and upper ends of the slots 147, said rod 148 being movable by control means that is not illustrated in the drawings. A sleeve 150 slidably surrounds the slotted region of the shaft 27 and is fastened to both the opposite ends of the substantially radial pin 149 that is fixed to the setting rod 148. The opposite ends of the pin 149 project beyond the sleeve 150 and have an inner pivotable but non-rotatable portion of a steering member 151 turnably connected to them. As can be seen in the drawings, the steering member 151 also includes an outer portion of annular configuration that is rotatable around the periphery of the inner tiltable portion thereof. The whole steering member 151 is of generally circular configuration and its center coincides with the axis 42.

The outer rotatable portion of the steering member 151 is provided at 45° intervals around its center with eight steering rods 152 whose radially inner ends are connected to the periphery of the steering member 151 by universal "ring and hole" couplings 153 or by other equivalent couplings such as ball and socket joints. The radially outer ends of the rods 152 are connected by similar couplings 154 to the ends of short steering arms 155. Each steering arm 155 has its opposite end connected to a corresponding pivotal shaft 156 that is mounted in the felly 43 of the rake member so as to rockable about its own axis which axis is parallel to the axis 42. The tine groups 45 are connected to the shafts 156 in a manner which can be similar to the indirect connection thereof to the hollow shafts 60 of Ser. No. 378,637. A semi-circular setting member 157 has its opposite ends fastened to the inner portion of the steering member 151 at one side of the sleeve 150 in such a way that its general plane is perpendicular to that of the steering member 151 and parallel to the axis 42. The semi-circular setting member is formed with an arcuately curved slot 158 whose center of curvature is coincident with the longitudinal axis of the pin 149. The setting member 157, together with the annular steering member 151, can be retained in any one of an infinite number of angular settings about the axis of the pin 149 between the limits dictated by the opposite ends of the slot 158 by tightening a screw-threaded clamping member 159 that has a part entered through the slot 158 and which, when tightened, temporarily clamps the setting member 157 against a further part thereof that is rigid with the sleeve 150.

The operation of the tine steering mechanism, or mechanism for pivoting the tines to and fro, that is illustrated in the drawings will now be described. Upon moving the setting rod 148 axially upward through the hollow shaft 27 by the operation of control means that is not illustrated, the pin 149 is similarly moved upwardly along the diametrically opposite slots 147. The sleeve 150, the steering member 151, the setting member 157 and the clamping member 159 all move upwardly along the shaft 27 with the pin 149 so that the steering rods 152 are brought to positions such as those indicated in broken lines by the reference 152A in FIG. 1 of the drawings. Since the rods 152 are of fixed length, the steering arms 155 and all of the tine groups 45 will be turned about the axes of the shafts 156 into positions such as those indicated in FIG. 2 of the drawings in broken lines for five of the tine groups 45 only. It will thus be seen that it is possible to change the trailing disposition of all eight of the tine groups 45, in common, with respect to the intended direction of rotation K of the rake member concerned. The extent of the trailing disposition is governed by the chosen axial position of the setting rod 148 lengthwise of the axis 42. This adjustment can, when required, be employed in conjunction with the further adjustment which will be described below.

Upon loosening the clamping member 159, the steering member 151 can be turned about the pivotal axis defined by the pin 149 within the limits set by the two ends of the slot 158. When a desired inclined position of the steering member 151 with respect to the axis 42 has been attained, the clamping member 159 is retightened and the general plane of the steering member 151 is retained in a position such as that illustrated in FIGS. 3 and 4. In this inclined position of the steering member 151, those tine groups 45 that are connected to rods 152 whose longitudinal axes are approximately in line with the axis of the pin 149 are not deflected at all, or only to a minimum extent, from positions in which, viewed lengthwise of the axis 42, the tines of the groups are substantially radially disposed or are trailing with respect to the direction K to only a very slight extent. On the other hand, those tine groups 45 that, at the same instant, are connected to rods 152 that, viewed lengthwise of the axis 42 (FIG. 4), are substantially perpendicular to the length of the pin 149 are deflected to a maximum trailing extent with respect to the direction of rotation K. It will be evident that the tine groups 45 rock to and fro about the axes defined by the pivotal shafts 156 between the two extreme positions which have just been described and that they will accordingly occupy angular settings somewhere between those two extreme positions as they progress around the axis 42 from one described extreme position to the other. FIG. 4 of the drawings indicates the intended direction of operative travel of the machine or implement of which the illustrated rake member forms a part by an arrow L and the axis of the pin 149 is so disposed with respect to the direction L that the tines 46 and 47 of the groups 45 occupy angular settings when they are at the front of the rake member with respect to the direction L that are most advantageous for contacting and picking up hay or other crop. As shown in FIG. 4 of the drawings, the hay or other crop would have to leave the illustrated rake member from a right-hand region thereof and it will be seen that, in this region, the tines of the groups 45 occupy substantially their maximum angularly trailing dispositions with respect to the direction K which dispositions are such that the tines are nearly tangential to the felly 43 as viewed lengthwise of the axis 42. The hay or other crop will slide readily off the tines when they are disposed in this way. It will be realised that the magnitude of the angularly trailing disposition with respect to the direction K of the tines of the groups 45 in the "shedding" region of the rake member that has just been discussed is influenced by the relationship between the length of each rod 152 and the perpendicular distance between the axis of each shaft 156 and the corresponding coupling 154. Both these distances are, of course, fixed as required during the manufacture of the machine or implement.

If, with the adjustment setting illustrated in FIGS. 3 and 4 of the drawings, the pin 149 should be moved upwardly as shown in FIG. 20 along the slots 147 by the rod 148, the trailing disposition of the tine groups 45 with respect to the direction k that are located at the right-hand side of the rake member as related to the direction L (FIG. 4) will be increased while the trailing disposition of those tine groups that are located at the opposite left-hand side of the rake member with respect to the direction L will be reduced. The reason for this will be readily apparent from FIG. 3 of the drawings in which it will be seen that upward movement of the pin 149 along the slots 147 will bring the right-hand rod 152 that is visible in that Figure to a position in which it is more steeply inclined to a line extending radially from the axis 42 whereas the rod 152 is shown at the left-hand side of the shaft 27 will become less steeply inclined to a line extending radially from the axis 42. This increases the degree of adjustability of the tine groups 45 during the use of the machine or implement and it will, of course, be realised that tilting the general plane of the steering member 151 in an opposite direction about the pin 149 to that shown in FIGS. 3 and 4 of the drawings would exert a symmetrically opposite influence upon the tine groups at the two sides of the rake member with respect to the direction L as compared with the effect that has just been described.

FIG. 5 of the drawings illustrates a further alternative tine steering mechanism in which a steering member 160 is used. The steering member 160 includes a central circular portion that is tiltable about the axis defined by the pin 149 but is not rotatable. The steering member 160 also includes an outer frusto-conical portion whose upper end of smallest diameter rotatably engages the periphery of the inner tiltable but non-rotatable portion.

Although the slots 147 are not shown in FIGS. 5 to 7 of the drawings, the pin 149 may again be arranged so as to be movable lengthwise along the shaft 27 carrying with it the sleeve 150, the setting member 157, the clamping member 159 and the steering member 160. It is by no means essential that the steering member 160 should be of generally frusto-conical configuration and it could, for example, be of part-spherical or part-hyperbolic configuration. In the illustrated embodiment, the inner ends of the steering rods 152 are again connected by the "ring and hole" couplings 153 or ball and socket joints or other equivalent universal couplings to the central steering member, and, in the case of the steering member 160, to locations close to the lowermost maximum diameter end of the rotatable portion thereof. All of the couplings 153 are contained in a plane that is perpendicular to the central axis of the frusto-conical steering member 160, this plane being located at a predetermined distance beneath the axis of the pin 149 as illustrated in FIG. 5 of the drawings. It should, however, be noted that it is possible to connect the couplings 153 movably to the steering member 160 in such a way that each of them can be moved individually to different settings upwardly and downwardly along the frusto-conical surface of that member. With such a construction, it is possible to locate the general plane which contains all of the couplings 153 at different distances from the axis of the pin 149 and it is even possible to position the couplings 153 in a way in which they are not all contained in a substantially common plane so that some tine groups 45 will be moved with respect to the felly 43 in different ways to other groups during the operation of the machine or other implement of which the rake member forms a part.

Upon retaining the plane of rotation of the steering member 160 in a setting such as that illustrated by way of example in FIGS. 6 and 7 of the drawings, all of the couplings 153 will be displaced with respect to the axis 42 as compared with the positions thereof that are shown in FIG. 5 of the drawings. This mutual displacement is due to the perpendicular spacing between the axis of the pin 149 and the plane which, in the position of adjustment shown in FIGS. 6 and 7 of the drawings, contains all of the couplings 153. In the embodiment of FIGS. 1 to 3 of the drawings, is substantially coincident with the plane of rotation of the outer rotary portion of the steering member 151. FIG. 7 of the drawings indicates the intended direction of rotation of the illustrated rake member by an arrow M and the intended direction of travel of the haymaking machine or other implement of which that rake member forms a part by an arrow N. It will be remembered that the plane of rotation of the whole rake member will normally be slightly inclined to the horizontal in such a way that the tines of its groups 45 will make their closest approach to the ground in a foremost, or nearly foremost, region of the rake member with respect to the direction N. With the illustrated adjustments, the tine groups 45 are substantially radially disposed with respect to the axis 42, or are trailing to a minimum extent with respect to the direction M, as they approach in the direction M the foremost region of the rake member with respect to the direction N. The tines are thus correctly disposed for contacting the picking up hay or other crop with optimum efficiency. As the tine groups 45 pass onwardly in the direction M to the right-hand side of the shaft 27 with respect to the direction N, they become progressively more trailing relative to the direction M until, at the right-hand side, as illustrated in FIG. 7, of the rake member, they are trailing to a maximum extent which is such as to dispose them nearly tangentially relative to the felly 43. The tines are thus correctly disposed for shedding crop with optimum efficiency in this region of the rake member and it will be realised from the earlier description and drawings that the rake member is shown in FIGS. 6 and 7 of the drawings suitably adjusted for the formation of swaths of hay or other crop. It is emphasised again that a haymaking machine or other implement in accordance with the invention may be furnished with only a single rake member and it will be realised that such a single rake member constructed in accordance with the embodiment of FIGS. 5 to 7 of the drawings would, in the position of adjustment shown in FIGS. 6 and 7, be employed primarily in the formation or lateral displacement of swaths.

Alteration of the angular setting of the frusto-conical steering member 160 about the axis of the pin 149 employing the setting member 157 and the clamping member 159 will alter the angular locations of the extreme positions of the rocking movements of the tine groups 45 about the axes defined by the shafts 156 without changing the amplitudes of those rocking movements. If all of the couplings 153 are changed in position by moving them identical distances towards, or away, from a plane that is perpendicular to the central axis of the frusto-conical steering member 160 and that contains the axis of the pin 149, then all of the couplings will be re-located in a new general plane that is parallel to the plane which has just been mentioned and the magnitudes of the rocking movements of the tine groups 45 about the axes of the shafts 156 will be increased or reduced with a consequent displacement of at least one of the extreme positions of each such rocking movement. It is pointed out again that it is not absolutely essential that the steering member 160 should be adjusted in such a way that all of its couplings 153 are contained in a single plane that is perpendicular to the central axis of the member. It is quite possible to retain the couplings 153 at different levels on the frusto-conical surface of the member 160 relative to the central axis of that member and operating circumstances can occur in which this possibility for adjustment is advantageous. The steering member 160 can be placed in a position in which its central axis substantially coincides with the axis 42 and in which all of the couplings 153 are contained in a single plane that is substantially perpendicular to the substantially coincident axes that have just been mentioned. In such a position of adjustment, which is shown in FIG. 5 of the drawings, the tine groups 45 are not steered or rocked at all about the axes of the shafts 156 and maintain constant more or less trailing positions with respect to the direction of rotation M throughout a complete revolution of the rake member. A position of adjustment of this kind can advantageously be used in, for example, tedding operation. It will also be remembered that the steering or rocking of the tine groups 45 can be influenced in a similar manner to that previously described in connection with FIGS. 1 to 4 of the drawings by displacing the steering member 160 lengthwise of the axis 42 employing the co-operating pin 149 and slots 147 which latter can be used on the FIGS. 5 to 7 structure.

It will be evident from the foregoing description and from FIGS. 5 to 7 of the drawings that a very large number of potential adjustments of the tine groups 45 are possible such adjustments including variations of the extreme positions of the rocking movements about the axes of the shafts 156 which they can make during each revolution of the rake member, the magnitudes of those rocking movements and the possibility of an individual adjustment for each of the eight tine groups 45 by retaining the corresponding couplings 153 in individual locations relative to the surface of the setting member 160. The range of possible uses of a haymaking machine or other implement having one or two such rake members that are rotatable in the same or opposite directions is considerably greater than with conventionally constructed haymaking machines or other raking implements. It should also be noted that a haymaking machine or other implement in accordance with the invention may include more than two rake members of one of the kinds that have been described and that such machines may have a large working width and be versatile to an extent which will enable them to be adjusted to tacke all likely hay and other crop displacing operations.

Each of the rake members or rake heads that has been described has included a felly but it is emphasised that this is not essential. The steerable or rockable tine groups 45 can equally well be coupled to spokes that are not interconnected by a felly. Furthermore, each of the rake members or rake heads that has been described has a construction in which, as viewed lengthwise of the axis of rotation thereof, the tine groups 45 project more or less radially outwardly. The various possibilities for steering or rocking the tine groups 45 during rotation of the rake members can, however, equally well be applied to rake members or rake heads having tines that are orientated principally in a downward direction from their connection points to the remainders of the corresponding rake members towards the ground surface. All that is required to enable the various tine steering mechanisms that have been described and illustrated to be applied to rake members or rake heads having such downwardly directed tines is a minor modification of the shape of the parts that interconnect the steering rods 152 and the downwardly directed tine groups that, with such a construction, would correspond to the described tine groups 45.

Although certain features of the implements for the displacement of crop or like material lying on the ground that have been described and/or illustrated in the accompanying drawings will be set forth in the following claims as inventive features, it is emphasised that the invention is not necessarily limited to those features and that it includes within its scope all of the parts of each such implement that has been described and/or illustrated both individually and in various combinations.

I claim:

1. A raking implement for displacing crop lying on the ground comprising at least one rake member, said member being rotatable on shaft means about a non-horizontal axis and having a plurality of rake elements that are movable into alternative crop working positions with respect to said axis, each of said working positions being the same for all of said rake elements during each revolution of the rake member in a chosen one of said alternative working positions, said rake elements being pivoted to support means on said rake member and means pivotably connecting said rake elements to ring-shaped adjustment means, said adjustment means being co-axially positioned relative to said non-horizontal axis and at least a portion of said adjustment means extending parallel to a plane perpendicular to that axis, said adjustment means being displaceably mounted on said member and movable lengthwise with respect to said axis, whereby all of said rake elements are moved from one of said working positions to an alternative working position when said adjustment means is moved lengthwise with respect to said axis.

2. The implement of claim 1, wherein said elements are tines and said tines extend outwardly with respect to the axis of rotation of said rake member in at least two of said working positions, said tines being movable to more or less trailing working positions with respect to the normal direction of rotation of said rake member.

3. The implement of claim 1, wherein said elements are connected to said adjustment means by corresponding rods.

4. The implement of claim 3, wherein said adjustment means is axially movable along said shaft means and the axial movements of said adjustment means are limited by stops on said shaft means.

5. The implement of claim 4, wherein said adjustment means is connected to a sleeve that is slidably mounted on said shaft means.

6. The implement of claim 4, wherein said adjustment means includes an annular outer portion that is rotatable about the periphery of an inner portion and said rods are pivoted to said outer portion.

7. The implement of claim 6, wherein said inner portion is pivoted to said shaft means by a pivot and said adjustment means as a whole is turnable on said pivot and tiltable relative to said shaft means.

8. The implement of claim 4, wherein said elements are tines that are pivoted to a felly support and said rods are connected to said tines throught respective eccentric arms on said felly support.

9. The implement of claim 1, wherein said portion is concentric with said axis and surrounds said shaft means.

10. The implement of claim 9, wherein said portion is slidably mounted on said shaft means.

* * * * *